Patented Mar. 4, 1947

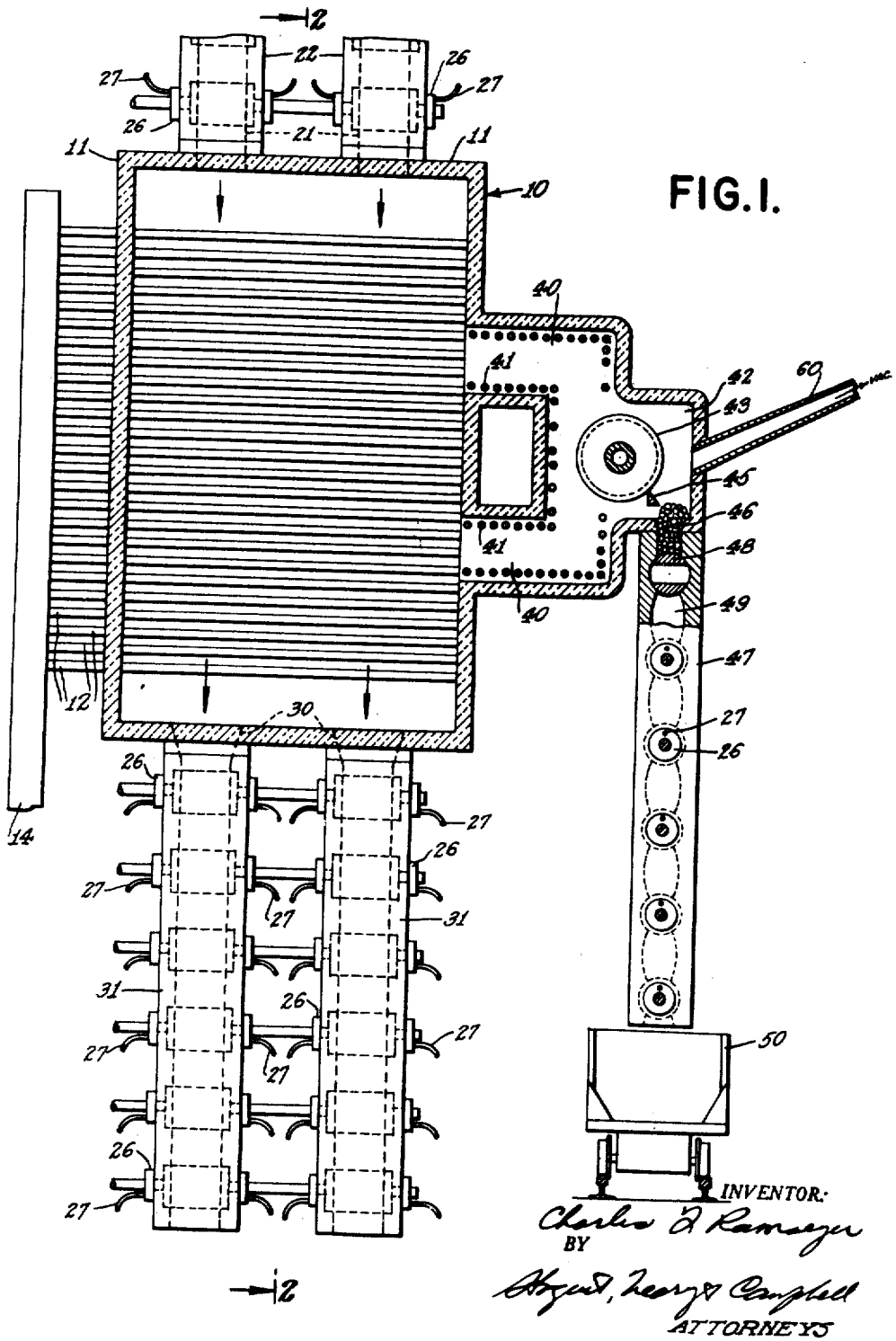

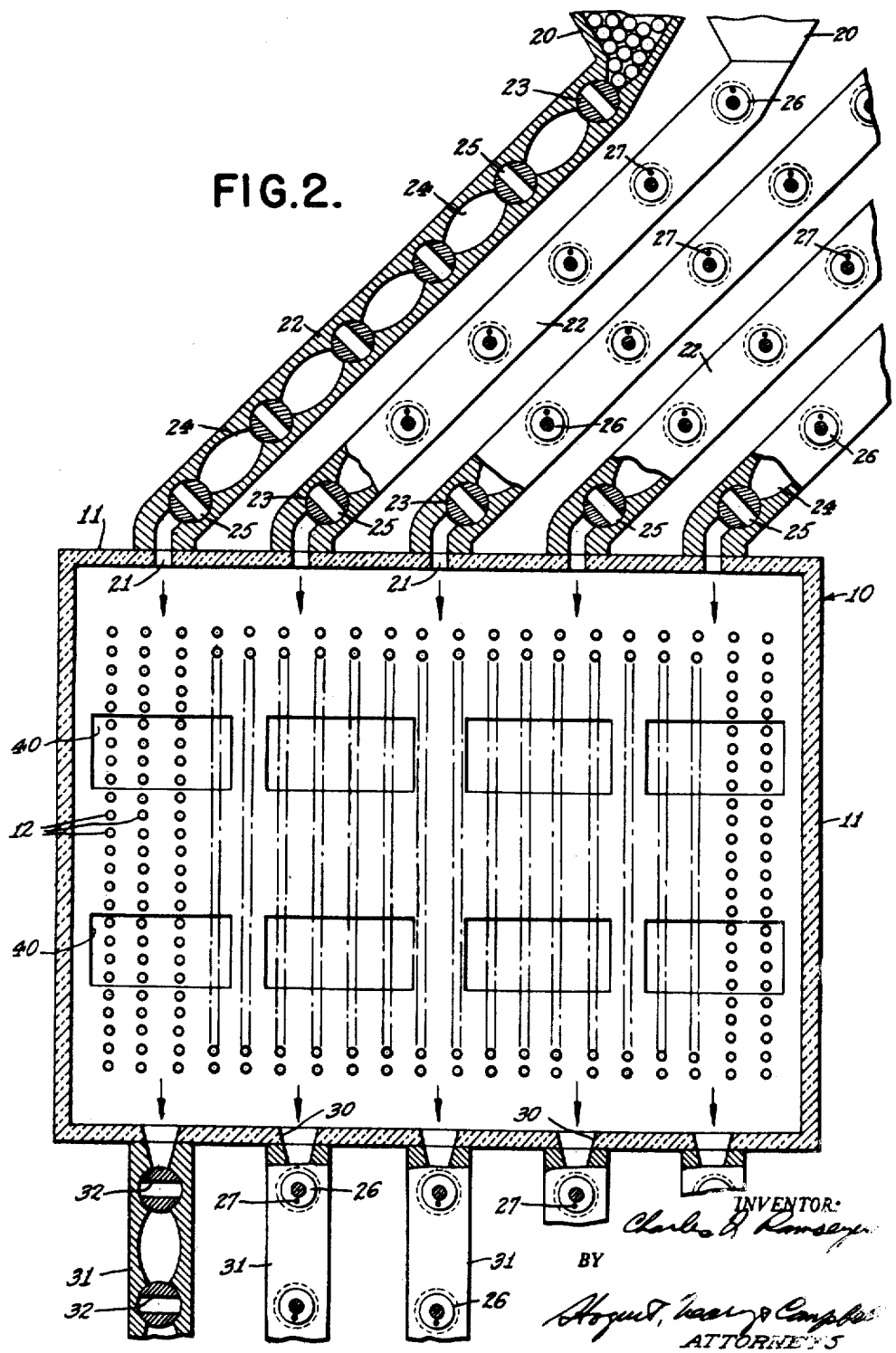

2,416,952

UNITED STATES PATENT OFFICE 2,416,952

REDUCTION OF MAGNESIUM

Charles F. Ramseyer, Old Greenwich, Conn., assignor to H. A. Brassert & Company, New York, N. Y., a corporation of Illinois Application August 7, 1943, Serial No. 497,790

6 Claims. (Cl. 266—19)

This invention relates to the production of magnesium and more particularly to an improved process of the type in which magnesium metal is obtained by the reduction of magnesia bearing material with a metallic reducing agent such as ferrosilicon, calcium carbide, silico-aluminum, scrap aluminum and various other combinations of solid reducing agents, under conditions to distill off the metallic magnesium and to selectively condense the magnesium vapor.

The best known of these processes is the Pidgeon process, which, as commonly carried out on a commercial scale utilizes retorts which are heated externally in a suitable furnace while maintained under a high vacuum which may be of the order of 10 microns of mercury to 100 microns of mercury. At these pressures magnesium is distilled at an operating temperature of about 2150° F. The retorts are charged with a mixture of calcined dolomite and ferrosilicon in briquette form and are operated a sufficient length of time to effect the desired reaction, after which they are opened and the magnesium removed.

In addition to the usual difficulties involved in operating a batch process on a commercial scale, the life of the retorts is comparatively short as they tend to collapse inwardly due to the high temperatures involved and the low internal pressures. Hence frequent replacement of retorts is a major item of expense in carrying on this process.

An object of the present invention is to provide a process in which the above-mentioned difficulties are obviated.

Another object is to provide a novel and improved continuous process for carrying out the above-mentioned reaction.

Another object is to provide a novel and improved furnace for carrying out such continuous process.

Various other objects and advantages will be apparent as the nature of the invention is more fully disclosed.

In accordance with the present invention I provide a furnace which is so arranged that the briquettes are subjected to intense radiant heat as they pass therethrough. I also provide mechanism for continuously and uniformly introducing briquettes into the furnace over its entire cross section, in small batches, and for continuously removing the used briquettes therefrom, without destroying the vacuum under which the furnace operates. The furnace is designed so that the entire charge in the furnace will descend slowly downward through the furnace at a substantially uniform rate throughout the whole heated zone.

Inasmuch as a high vacuum is involved there is practically no gas present in the furnace to aid in the heat transfer. Radiant heat transfer and heat conduction between the solid particles of the briquettes must accordingly be relied upon and must be so utilized as to obtain a rapid transfer of heat to the mass of briquettes which is to be reacted.

I accomplish this by providing a plurality of horizontally spaced vertical banks of radiant heating tubes which extend through one wall of a furnace in either a horizontal or vertical direction in the case of hairpin or return bend heating tubes, and through two walls in the case of straight-through heating tubes. Placing the radiant heating tubes horizontally has the advantage that the size of the tubes may be decreased from top to bottom of the furnace so as to obviate any hanging up of the charge, the decreasing tube sizes thereby forming vertical walls having a slight taper, or deviation from the vertical. The advantage of placing the tubes forming the vertical walls in a vertical position is that the descending briquettes would move uniformly downward without any danger of lodging between one horizontal tube and the next one. Depending on constructional details and the size of a given furnace, either one or the other of these two arrangements may be the more satisfactory. The banks are spaced apart to provide narrow channels therebetween through which the briquettes pass, preferably vertically, in their passage through the furnace. The tubes themselves are preferably of relatively small diameter, considerably smaller than the diameter of the Pidgeon retorts, and are internally heated as by gas firing. Due to their small size the tubes may be made without excessive cost, of an alloy which is suited to the temperatures involved and which is sufficiently strong to withstand the comparatively low pressure differential of one atmosphere. Since the pressure will be inside the tubes, there is no danger of collapse of the tubes by external pressure, which has been the main cause of the failure of the Pidgeon process retorts. A number of sets of vacuum locks in a series-parallel arrangement is provided for the continuous introduction of the briquettes to the top of the furnace and a similar set of vacuum locks is provided for withdrawing the used briquettes from the bottom of the furnace.

The magnesium vapor is withdrawn from the reaction chamber and is condensed by contact with a cold surface such as a water-cooled, rotating drum. The magnesium crystals may be continuously scraped from this drum as it rotates and deposited in a chamber from which it may be removed through a vacuum lock.

Although the novel features which are believed to be characteristic of this invention are pointed out more particularly in the claims appended hereto, the invention may be better understood by referring to the following description, taken in connection with the accompanying drawings in which a specific embodiment thereof has been set forth for purposes of illustration.

In the drawings:

Fig. 1 is a vertical longitudinal section through a furnace embodying the present invention; and Fig. 2 is a transverse vertical section through the furnace taken on the line 2—2 of Fig. 1.

In the following description certain specific terms are used for convenience in referring to various details of the invention. These terms, however, are to be given as broad an interpretation as the state of the art will permit.

Referring to the drawings more in detail, the invention is shown as applied to a vacuum tight furnace 10 having walls 11 which are formed of any suitable material capable of withstanding the pressure to which they are subjected. The shell is suitably insulated to avoid loss of heat, and to keep the temperature high enough at all points so that magnesium vapor will not condense on it at any point. The furnace 10 is shown as of rectangular shape and is provided with a plurality of banks of tubes 12 which extend between the front and back walls of the furnace and are connected to a fuel supply header 14. The tubes 12 are divided into a plurality of vertical banks which are spaced across the furnace to provide narrow rectangular vertical passages therebetween through which the briquettes may pass. Suitable fuel for heating the tubes 12 is supplied by the headers 14 whereby the tubes are operated at a temperature to produce radiant heat within the intertube spaces of the furnace.

The briquettes are made of such size, shape and density; for instance, highly compressed 1" diameter spheres—that they will move easily and uniformly down between the radiant tube walls without sticking or hanging and with a minimum of dusting.

For supplying briquettes to the furnace there are provided a plurality of hoppers 20 connected to charge openings 21 in the top of the furnace by ducts 22. In the embodiment shown a plurality of such charge openings 21 and ducts 22 are provided which are spaced along the top of the furnace so as to apply the briquettes evenly thereto. It is to be understood of course that the number or arrangement of such charge openings and supply ducts may be varied as desired.

Each supply duct 22 is provided with a plurality of valves 23 which are spaced to form chambers 24 therebetween. The valves 23 are shown as of the barrel type and are designed to effect a vacuum tight seal. The valves are provided with transverse openings 25 which permit the passage of briquettes from one chamber 24 to the next successive chamber when the valves are in open position. When closed, however, the valves form a vacuum tight seal to prevent loss of vacuum from the furnace. By utilizing a plurality of valves in series, as shown, each valve is subjected to only a fraction of the total pressure differential. Hence the problem of maintaining a proper seal is reduced to a minimum. If desired the valve bearings may include hollow glands 26 in which a balanced vacuum may be maintained by an auxiliary vacuum pump, not shown, connected to the chambers by vacuum lines 27. Such a vacuum seal prevents gases from flowing through the bearing areas and injuring the same. It also prevents loss of vacuum through the valve bearings.

In the embodiment shown six valves 23 are spaced along each duct 22 to provide five intervening vacuum locks 24. It is to be understood of course that this number may be varied as desired for obtaining the required operating characteristics.

The spent briquetttes are removed through exit ports 30, each of which is connected to a duct 31, similar to the supply ducts 22 above mentioned, and each of which is provided with a plurality of spaced valves 32 forming vacuum locks 33 similar to the locks 24 above mentioned.

The magnesium vapor is removed from the furnace chamber through a set of ducts 40 which may be lined with suitable refractory insulating material and may be provided with heating pipes 41 which maintain the ducts at a temperature suited to prevent condensation of magnesium therein. Electric heating means may be used if desired since only radiation losses have to be compensated for. Of course, if electricity is cheap enough, electric heat may be used throughout. The ducts 40 are shown as communicating with a condensing chamber 42 containing a water-cooled drum 43 on which the magnesium is condensed.

In the embodiment shown a set of four ducts 40 is spaced across the width of the furnace in registration with the various intertube bank passages so as to facilitate the uniform removal of the magnesium vapor therefrom. The number of such ducts may of course be varied as desired and ducts may be of any suitable length for conveying the magnesium vapors to the condensing chamber 42 which may be located at a distance from the furnace.

A scraper 45 is shown for removing the condensed magnesium powder from the surface of the drum 43 and depositing the same in a removal chamber 46 which communicates with a duct 47 having a plurality of valves 48 spaced therealong to form vacuum locks 49 as described above in connection with ducts 22 and 31. The duct 47 leads to a suitable discharge point, shown as a car 50 in which the magnesium is collected.

The vacuum is maintained in the furnace 10 by means of a pipe connection 60 which leads to a suitable vacuum pump, not shown. The pipe 60 communicates with the condensing chamber 42 so as to cause a flow of vapor from the furnace to the condensing chamber.

The ducts 22 are preferably inclined to the vertical as shown so as to permit the briquettes to roll down the surface thereof and thereby reduce the tendency of the briquettes to fracture, so as to keep the amount of dust produced at a minimum. Dust causes operating difficulties, since it interferes with the transmission of heat into the mass of the briquettes by acting as an insulating material, and it also tends to be sucked out of the furnace along with the magnesium vapor, thus contaminating the product, and plugging up vacuum lines.

In the operation of a system of the above type the calcined dolomite and ferrosilicon is customarily briquetted while dry and without a binder. These briquettes are supplied to the hoppers 20 and are successively fed through the various vacuum locks 24 into the furnace 10 until the spaces between the various banks of tubes are filled with briquettes. The briquettes are then removed through the ducts 31 and additional briquettes are supplied through the ducts 22 at a rate suited to maintain each briquette in the radiant heat zone a sufficient length of time for completing the reduction and vaporizing or distilling off the magnesium. The rate is dependent upon the rate of heat transfer, which is determined largely by the spacing and temperature of the tubes and the relative size and density of the briquettes.

As the magnesium vapor is removed to the condensing chamber 42 it is continuously condensed on the rotating drum 43, is deposited into discharge chamber 46, and may be continuously removed through the series of vacuum locks 49.

The tubes 12 are preferably arranged so that the individual tubes may be readily removed and replaced. They are shown arranged horizontally but they may also be arranged vertically.

It is to be noted that the above process is suited to continuous operation and eliminates the necessity for frequent shut-down as in batch operation. The process may be economically carried out on a commercial scale. The main costs of the Pidgeon process as carried out at present; i. e., high labor cost due to small batch operation and high retort cost due to the early failure of the retorts under vacuum, are both eliminated by the process herein described.

It will be noted that a multiplicity of relatively small valves are used for maintaining a vacuum seal. This is an important feature because it would be practically impossible to maintain large valves vacuum tight under the severe operating conditions encountered. For example, the inlet valves nearest the furnace are exposed to a high temperature and the outlet valves must handle spent briquettes at a red heat. Warpage difficulties would be serious if large valves were used. Furthermore, water cooling would be impractical due to condensation of magnesium vapor on cool surfaces which would clog the valves.

Although a specific embodiment has been shown for purposes of illustration, the invention is capable of various uses and is only to be restricted in accordance with the scope of the following claims.

I claim:

1. An apparatus for the production of magnesium comprising a furnace containing a plurality of spaced banks of radiant heat tubes providing vertical passages therebetween, means heating said tubes to radiance, a plurality of ducts having a multiplicity of vacuum locks therein for introducing a mixture of intimately commingled magnesium oxide containing material and solid reducing material through the passages between the respective banks of tubes in radiant heat transfer relationship therewith, a condensing chamber, a duct connecting said condensing chamber with said furnace for supplying magnesium vapor from said furnace to said condensing chamber, means maintaining said condensing chamber and said furnace under a high vacuum, and means including ducts having a multiplicity of vacuum locks therein for removing the spent material therefrom.

2. An apparatus for the production of magnesium comprising a furnace containing a plurality of spaced banks of radiant heat tubes forming substantially straight vertical passages therebetween, a fuel supply header for heating said tubes to radiance, means including ducts having vacuum locks therein for introducing a mixture of intimately commingled magnesium oxide containing material and solid reducing material between the respective banks of tubes in radiant heat transfer relationship therewith, a condensing chamber, a duct connecting said condensing chamber with said furnace for supplying magnesium vapor from said furnace to said condensing chamber, means maintaining said condensing chamber and said furnace under a high vacuum, means including ducts having vacuum locks therein for removing the spent material from said passages, a rotating drum in said condensing chamber maintained at a temperature to condense magnesium crystals on the surface thereof, means for removing said crystals from the surface of said drum, and means including a duct having a vacuum lock therein for removing said crystals from said chamber.

3. An apparatus for the production of magnesium comprising a furnace containing a plurality of spaced banks of radiant heat tubes forming a plurality of substantially straight vertical passages therebetween, means for supplying gases of combustion to said tubes for heating said tubes to radiance, ducts having a multiplicity of vacuum locks therein for introducing a mixture of intimately commingled magnesium oxide containing material and solid reducing material between the respective banks of tubes in radiant heat transfer relationship therewith, a condensing chamber, a duct connecting said condensing chamber with said furnace for supplying magnesium vapor from said furnace to said condensing chamber, means maintaining said condensing chamber and said furnace under a high vacuum, and means including ducts having a multiplicity of vacuum locks therein for removing the spent material from said furnace, said supply and discharge ducts being spaced along said furnace for supplying the charge uniformly thereto.

4. An apparatus for the production of magnesium comprising a furnace containing a plurality of spaced banks of radiant heat tubes forming a plurality of substantially straight vertical passages therebetween, means including a fuel supply header for passing gases of combustion through said tubes for heating said tubes to radiance, a condensing zone maintained at a temperature to condense magnesium vapor therein, means maintaining said condensing zone and said furnace under a high vacuum, and a plurality of supply ducts supplying briquettes to said furnace for movement along said passages, each supply duct having about five spaced valves therein forming vacuum locks therebetween.

5. An apparatus for the production of magnesium comprising a furnace containing a plurality of spaced banks of radiant heat tubes forming at least one substantially straight vertical passage therebetween, means for supplying gases of combustion to the interior of said tubes for heating said tubes to radiance, at least one duct for supplying a mixture of intimately commingled magnesium oxide containing material and solid reducing material between the respective banks of tubes in radiant heat transfer relationship therewith for movement along said passage, a condensing chamber, a duct connecting said condensing chamber with said furnace for supplying delivering magnesium vapor from said furnace to said condensing chamber, means maintaining said condensing chamber and said furnace under a high vacuum, each supply duct having a plurality of valves spaced therealong to form vacuum locks therebetween.

6. An apparatus for the production of magnesium comprising a furnace containing a plurality of spaced banks of radiant heat tubes forming a plurality of substantially straight vertical passages therebetween, means including a fuel supply header for passing gases of combustion through the interior of said tubes for heating said tubes to radiance, a plurality of supply ducts supplying said material to said passages for movement between said banks of tubes in radiant heat transfer relation therewith, a condensing chamber, a duct connecting said condensing chamber with said furnace for delivering magnesium vapor from said furnace to said condensing chamber, means maintaining said condensing chamber and said furnace under a high vacuum, each duct having a plurality of valves spaced therealong to form vacuum locks therebetween and a set of discharge ducts for removing spent material, each supply and discharge having a multiplicity of spaced valves forming a series of vacuum locks therein.

CHARLES F. RAMSEYER.

REFERENCES CITED

The following references are of record in the file of this patent:

UNITED STATES PATENTS

| Number | Name | Date |
| --- | --- | --- |
| 796,312 | Galbraith | Aug. 1, 1905 |
| 898,343 | Durak | Sept. 8, 1908 |
| 2,257,910 | Kirk | Oct. 7, 1941 |
| 2,337,042 | Gloss | Dec. 21, 1943 |
| 2,164,410 | Kemmer | July 4, 1939 |
| 2,287,038 | Janes | June 23, 1942 |
| 2,362,718 | Pidgeon | Nov. 14, 1944 |

---

Certificate of Correction

Patent No. 2,416,952.   March 4, 1947.

CHARLES F. RAMSEYER

It is hereby certified that error appears in the printed specification of the above numbered patent requiring correction as follows: Column 6, lines 73 and 74, strike out the word "supplying"; and that the said Letters Patent should be read with this correction therein that the same may conform to the record of the case in the Patent Office.

Signed and sealed this 6th day of May, A. D. 1947.

[SEAL]

LESLIE FRAZER,
*First Assistant Commissioner of Patents.* taining said condensing chamber and said furnace under a high vacuum, each supply duct having a plurality of valves spaced therealong to form vacuum locks therebetween.

6. An apparatus for the production of magnesium comprising a furnace containing a plurality of spaced banks of radiant heat tubes forming a plurality of substantially straight vertical passages therebetween, means including a fuel supply header for passing gases of combustion through the interior of said tubes for heating said tubes to radiance, a plurality of supply ducts supplying said material to said passages for movement between said banks of tubes in radiant heat transfer relation therewith, a condensing chamber, a duct connecting said condensing chamber with said furnace for delivering magnesium vapor from said furnace to said condensing chamber, means maintaining said condensing chamber and said furnace under a high vacuum, each duct having a plurality of valves spaced therealong to form vacuum locks therebetween and a set of discharge ducts for removing spent material, each supply and discharge having a multiplicity of spaced valves forming a series of vacuum locks therein.

CHARLES F. RAMSEYER.

REFERENCES CITED

The following references are of record in the file of this patent:

UNITED STATES PATENTS

| Number | Name | Date |
|---|---|---|
| 796,312 | Galbraith | Aug. 1, 1905 |
| 898,343 | Durak | Sept. 8, 1908 |
| 2,257,910 | Kirk | Oct. 7, 1941 |
| 2,337,042 | Gloss | Dec. 21, 1943 |
| 2,164,410 | Kemmer | July 4, 1939 |
| 2,287,038 | Janes | June 23, 1942 |
| 2,362,718 | Pidgeon | Nov. 14, 1944 |

---

Certificate of Correction

Patent No. 2,416,952.  March 4, 1947.

CHARLES F. RAMSEYER

It is hereby certified that error appears in the printed specification of the above numbered patent requiring correction as follows: Column 6, lines 73 and 74, strike out the word "supplying"; and that the said Letters Patent should be read with this correction therein that the same may conform to the record of the case in the Patent Office.

Signed and sealed this 6th day of May, A. D. 1947.

[SEAL]

LESLIE FRAZER,
*First Assistant Commissioner of Patents.*